US008798571B2

(12) United States Patent
Shih et al.

(10) Patent No.: US 8,798,571 B2
(45) Date of Patent: Aug. 5, 2014

(54) METHOD OF MANAGING POWER CONSUMPTION OF PORTABLE COMPUTER AND PORTABLE COMPUTER USING THE SAME

(75) Inventors: Chien Yi Shih, Taipei (TW); Jung Tsan Hsu, Taipei (TW)

(73) Assignee: Via Technologies Inc., Taipei (TW)

( * ) Notice: Subject to any disclaimer, the term of this patent is extended or adjusted under 35 U.S.C. 154(b) by 562 days.

(21) Appl. No.: 11/247,348

(22) Filed: Oct. 11, 2005

(65) Prior Publication Data

US 2007/0081504 A1 Apr. 12, 2007

(51) Int. Cl.
*H04B 1/16* (2006.01)
*H04W 52/02* (2009.01)
*G06F 1/32* (2006.01)
*H04W 28/22* (2009.01)
*H04W 88/02* (2009.01)

(52) U.S. Cl.
CPC ........... *G06F 1/3203* (2013.01); *H04W 52/028* (2013.01); *G06F 1/324* (2013.01); *Y02B 60/50* (2013.01); *Y02B 60/1278* (2013.01); *H04W 28/22* (2013.01); *G06F 1/3287* (2013.01); *H04W 88/02* (2013.01); *G06F 1/325* (2013.01); *Y02B 60/1282* (2013.01); *H04W 52/0235* (2013.01); *Y02B 60/1217* (2013.01); *Y02B 60/1285* (2013.01); *G06F 1/3253* (2013.01); *G06F 1/3296* (2013.01); *Y02B 60/1235* (2013.01); *H04W 52/029* (2013.01)
USPC .................. 455/343.1; 455/343.2; 455/343.5; 455/550.1; 455/557; 370/311

(58) Field of Classification Search
USPC ............ 370/463, 338, 311; 455/343.1, 343.2, 455/343.5, 550.1, 557, 558, 556.2
See application file for complete search history.

(56) References Cited

U.S. PATENT DOCUMENTS

| 6,725,302 | B1 * | 4/2004 | Benayoun et al. ............... 710/62 |
| 2002/0142792 | A1 * | 10/2002 | Martinez ...................... 455/550 |
| 2002/0186214 | A1 * | 12/2002 | Siwinski ...................... 345/212 |
| 2004/0078606 | A1 * | 4/2004 | Chen et al. .................... 713/300 |
| 2005/0047382 | A1 * | 3/2005 | Park et al. ..................... 370/338 |
| 2006/0095801 | A1 * | 5/2006 | Penning et al. ............... 713/320 |
| 2006/0244422 | A1 * | 11/2006 | DiGiovanna et al. ......... 320/137 |
| 2006/0271747 | A1 * | 11/2006 | Geiger et al. ................. 711/154 |

FOREIGN PATENT DOCUMENTS

| JP | 2004310174 | 11/2004 |
| JP | 2004310174 A * | 11/2004 |
| TW | 200411368 | 7/2004 |
| TW | 200519575 | 5/2006 |

OTHER PUBLICATIONS

China Office Action mailed Mar. 9, 2007.
TW Office Action mailed Jul. 30, 2008.
English Abstract of TW200411368.
English Abstract of TW200519575.

* cited by examiner

*Primary Examiner* — Khai M Nguyen
(74) *Attorney, Agent, or Firm* — McClure, Qualey & Rodack, LLP

(57) ABSTRACT

The present invention relates to a power management method for portable computers with a wireless device and detects the electric power source of a portable computer through a power source detection circuit during the operation of portable computer. In addition, any one of the following is dynamically changed: the supporting rate of the connection interface between a wireless device and the portable computer, the data rate between the AP (Access Point) and the wireless device. Moreover, the invention provides a plurality of input methods for triggering the power saving modes of the portable computer to achieve the object of reducing power consumption.

2 Claims, 5 Drawing Sheets

| Wireless device | | | USB I/F (device) | Host Controller Change USB interface mode by Datach and Re-attach |
|---|---|---|---|---|
| 802.11a (Mbps) | 802.11b (Mbps) | 802.11g (Mbps) | | |
| 54 | | 54 | USB 2.0 | USB 2.0 |
| 48 | | 48 | | 1. H mode:up to 480 Mbps |
| 36 | | 36 | | |
| 24 | | 24 | | |
| 18 | | 18 | | |
| 12 | | 12 | | 2. F mode:up to 12 Mbps |
| | 11 | 11 | | |
| 9 | | 9 | | 3. L mode:up to 1.5 Mbps |
| 6 | | 6 | | |
| | 5.5 | 5.5 | USB 1.1 | USB 1.1 |
| | 2 | 2 | | 1. F mode:12 Mbps |
| | 1 | 1 | | 2. L mode:up to 1.5 Mbps |

FIG. 5

METHOD OF MANAGING POWER CONSUMPTION OF PORTABLE COMPUTER AND PORTABLE COMPUTER USING THE SAME

BACKGROUND

The present invention relates to a method of managing power consumption of a portable computer, and more particularly to a method of managing power consumption of a portable computer connected to a wireless device with a connection interface for a wireless communication system. The portable computer with a battery can include a PDA mobile phone, smart phone notebook PC, and the like.

To attain better working efficiency in current portable computers, the operating speed and capability of a mobile CPU, which is used particularly for portable computers, has been enhanced. Therefore, the power consumption of mobile CPUs for the portable computers has increased relatively, resulting in greater heat. Hence, both Intel and Microsoft have provided excellent electronic power management for mobile CPUs of portable computers, such as Advanced Configuration and Power Interface (ACPI) and Speed step. ACPI has defined five states from C0 to C4, the higher states have better electric power management efficiency. However, mobile CPUs of portable computers still have some drawbacks, e.g., the newly promoted mobile CPU speed of portable computers on the market always lags behind desktop CPUs by at least three to six months, and the price is also higher than desktop PCs.

The issue of power saving is important for a portable computer which needs a battery as a power source. If the system power consumption can be reduced, battery life-time (working time) can be extended.

US patent publication No. 2004/0078606 is a prior art which provides a power management method for portable computers in order to dynamically tune up voltage and frequency of a portable computer, and maintains normal operation of the portable computer. The components for adjustment are the External Clock and voltage of CPU, frequency of memory, or frequency and performance of the Video Graphics Array (VGA) card or the frequency of memory.

The apparatus of the related art, however, can not further improve power saving for a portable computer connected to a wireless device in a wireless communication system. The power consumption required by the data transmission of the transmitter and the receiver of the wireless device in the communication system is large. This situation can occur for a PDA mobile phone, smart phone, notebook PC with a wireless device, and the like.

To solve the described problem, the present invention provides a power management method for a wireless communication system which includes an AP and a portable computer connected to a wireless device.

SUMMARY

The present invention provides an apparatus and method for a one-button power-saving WLAN system with an USB interface triggered by a one-button switch.

The present invention provides an apparatus and method of reducing power consumption of a portable computer applied in a wireless communication system, the wireless communication system includes an AP and a wireless device connected to a host computer with a USB interface by adjusting the USB supporting rate and data rate between AP and the wireless device.

The present invention relates to a power management method for portable computers with a wireless device and detects the power source of the portable computer through a power source detection circuit during operation, and dynamically changes any one of the following: the supporting rate of the connection interface between a wireless device and the portable computer; the data rate between the AP (Access Point) and the wireless device. Moreover, the invention provides a plurality of input methods to trigger the power saving mode of a portable computer for achieving reduced power consumption.

DESCRIPTION OF THE DRAWINGS

The invention can be more fully understood by reading the subsequent detailed description and examples with references made to the accompanying drawings, wherein:

FIG. 5 is a table related to the standards for an 802.11a/b/g, and USB interface in the present invention.

DESCRIPTION

Finalized in 2001, USB 2.0 is a complete overhaul to the Universal Serial Bus input/output bus protocol which achieves substantial gain over USB 1.1 standard did. As an aside, USB mice and keyboards require only 1.5 Mbits/s to function.

USB 1.1 allowed a maximum transfer rate of 12 Mbits/second. The USB 2.0 specification incorporates three speeds: Hi-Speed, Full-Speed and Low-Speed. Low Speed USB mode is 1.5 Mbits/second, Full Speed USB mode is 12 Mbits/second, and Hi-Speed USB mode is up to 480 Mbits/second.

First Preferred Embodiment

One-Switch Power-Saving Function

Figure 1:
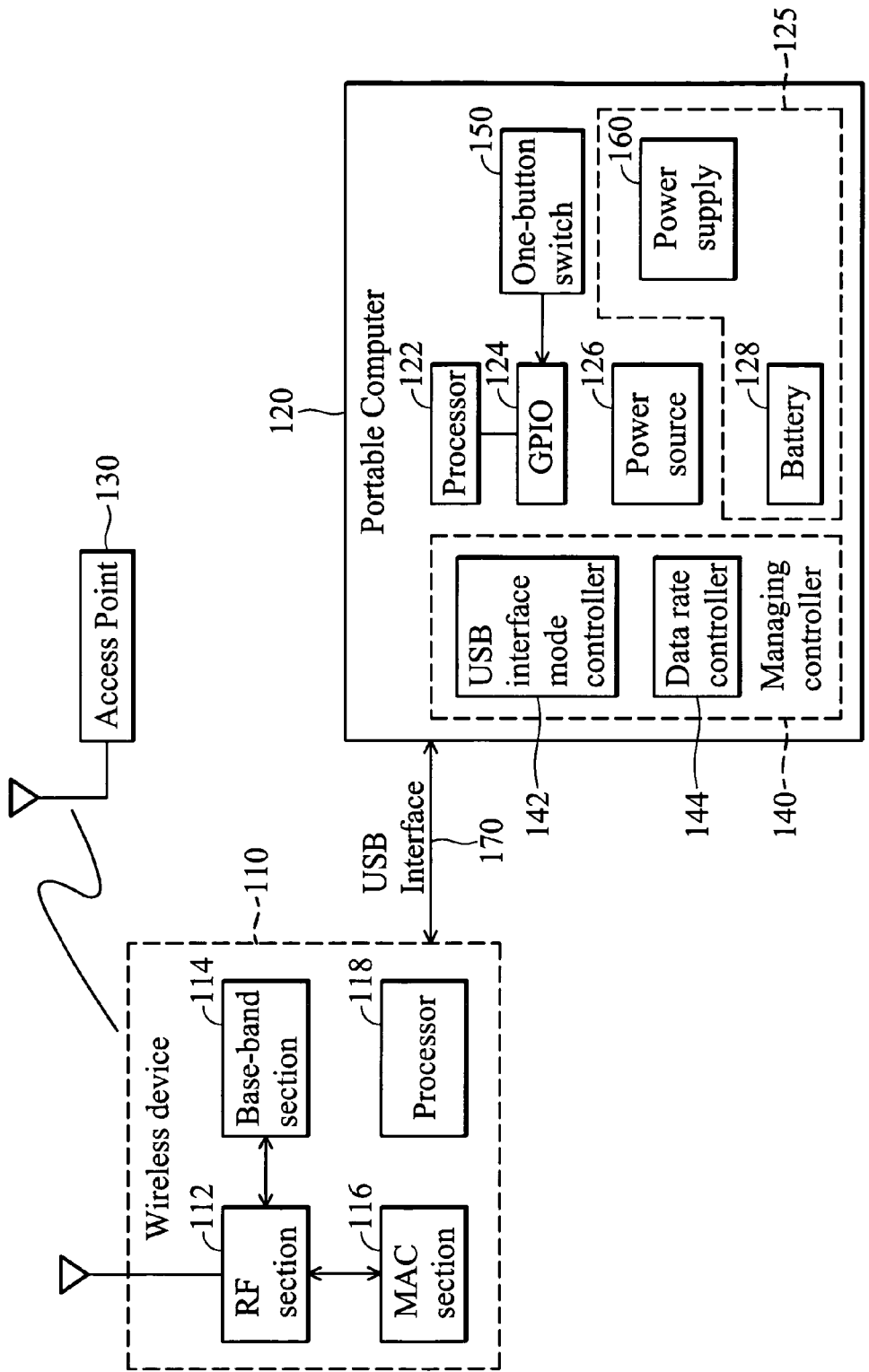
FIG. 1 is a function block diagram of a portable computer according to the first embodiment of the invention.

FIG. 1 is a function block diagram of a portable computer according to the first embodiment of the invention. The portable computer 120, such as a notebook computer, communicates with an access point (AP) 130 through a wireless device 110.

The wireless device 110 connects to the portable computer 120 via USB interface 170. The wireless device 110, such as 802.11a, 802.11b or 802.11g wireless device, includes an RF section 112, a MAC (Medium Access Control) section 116 and a baseband section 114, communicating with the AP 130 using a data rate. The portable computer 120 includes managing controller 140 which comprises an USB interface mode controller 142 for changing USB interface mode according to detaching and re-attaching operation and a data rate controller 144 for adjusting data transmission rate between the wireless device 110 and the AP 130, a power source detector 126, a power unit 125 and a one-button switch 150 connected to a GPIO (General Purpose Input Output) 120, and the GPIO 120 connected to a processor 122.

The power unit 125 comprises a battery 128 and power supply 160 which receives and converts an external AC source, respectively powering the portable computer 120.

In this embodiment, when the switch 150 is activated or pushed, a power-saving event will be triggered. The power source detector 126 is used to recognize that the portable computer 120 is powered by the battery 128 or the power supply 160 and to detect the power level of the power unit 125.

Figure 2:
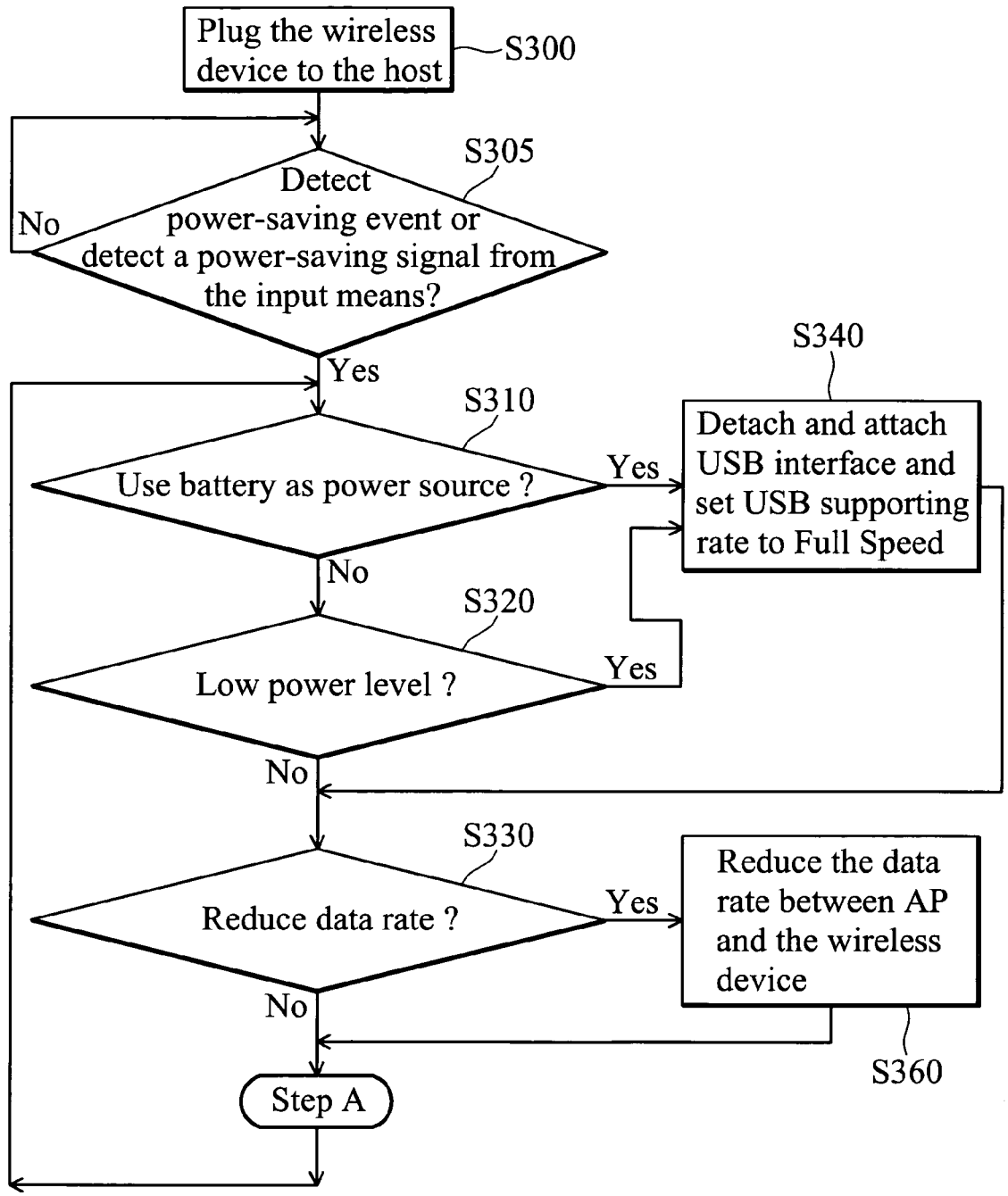
FIG. 2 is a flowchart showing the steps of a power management method of the first embodiment applied to the portable computer in FIG. 1.

FIG. 2 is a flowchart showing the steps of a power management method of the first embodiment applied to the portable computer 120 in FIG. 1.

At step S300, the wireless device 110 is plugged into the portable computer 120 through the USB interface 170.

At step S305, it is detected if a power-saving event is trigged (when pushing the switch 150) or a power-saving signal is input from the input device (such as the keyboard of the portable computer 120). When the power-saving event or the power-saving signal is detected, step S310 is carried out otherwise step S305 is repeated.

At step S310, if the portable computer 120 is powered by the battery 128 based on the detection of the power source detector 126, then step S340 is carried out otherwise step S320 is carried out.

At step S320, if the power level of the power supply 160 is low power, then step S340 is carried out otherwise step S330 is carried out.

At step S330, if the power-saving signal instructs to reduce the data rate between the AP 130 and the wireless device 110 through the control of the data rate controller 144, then step S360 is carried out to reduce the data rate between AP and the wireless device, otherwise step A is performed. In this embodiment step A does nothing, i.e., at step S360, the power consumption of the portable computer 120 is reduced by reducing the data rate.

At step S340, the USB interface mode is changed by performing a detaching and re-attaching operation through the control of the USB interface mode controller 142 and the USB supporting rate is set to full speed. In this embodiment, if the default USB interface mode is USB 2.0, it can be changed to be USB 1.1 interface mode in response to the power-saving event. Another implementation or option as described below, if the default USB interface mode is USB 2.0 with supporting rate up to 480 Mbps (H mode), the supporting rate is reduced to a second supporting rate such as 1.2 Mbps (F mode) or 1.5 Mbps (L mode) in response to the power-saving event; if the default USB interface mode is USB 1.1 with a supporting rate of up to 12 Mbps (F mode), the supporting rate is reduced to a second supporting rate such as 1.5 Mbps (L mode) in response to the power-saving event. After step S340 is performed, step S330 is subsequently performed.

In the other words, the present invention provides a power management method for managing power consumption of a portable computer having a battery and communicating with an access point (AP) through a wireless device connected to the portable computer via a USB interface. The USB interface at least has a first and second mode respectively with a first and second supporting rate less than the first supporting rate. The AP communicates with the wireless device with a first data rate. The portable computer works under a first clock frequency and a first reference voltage, wherein the portable computer includes a first circuit which is in standby or suspends its function in the power-saving mode, and the wireless device includes a second circuit which is in standby or suspends its function in power-saving mode, the method comprises the steps of:

(a) inputting a power-saving signal through an input device, such as keyboard of the portable computer;

(b) detaching and re-attaching the wireless device to the portable computer to change the USB interface mode from the first supporting rate to the second supporting rate, wherein the second supporting rate is less than the first supporting rate;

(c) decrease the first data rate to a second data rate between the AP and the wireless device, wherein the second date rate is less than the first data rate.

The power saving function is triggered when:

A. The user determines the time to enforce the system to execute the power-saving function which is triggered by pushing a button, i.e., the power-saving signal is generated via a switch coupled to a GPIO to trigger the power-saving function.

B. The system itself determines when to execute a power-saving function, as following.

a. The power source is changed from AC to battery, i.e., the AC plug of the portable computer is detached.

b. Low power indication for system power is detected. It can be implemented by a system event received by the portable computer, then notify the USB device, USB interface mode controller and data rate controller, to execute the power-saving function.

C. The USB interface only needs a bandwidth of 12 Mbps (i.e. USB Full Speed) for transmission.

For example, the maximum data rate is 54 Mbps for an 802.11a/g wireless device, the portable computer can reduce the USB supporting rate from 480 Mbps to 12 Mbps to reduce the power consumption of the USB interface.

For example, when the data rate of WLAN is less than a threshold, i.e., the bottleneck is the data rate, the portable computer can reduce the data rate of the wireless device to reduce the power consumption of the wireless device.

U.S. Pat. No. 6,765,416B2, entitled "Device for recognizing power source and associated method", disclosed a device for recognizing a power source by voltage-dividing circuits can be applied in the circuit of power source detector 126 in FIG. 1. The power source detector 126 is used to detect that the current power source is external AC power supply 160 or the battery 128. If the power source is battery or detected to be low power, the portable computer will reduce the USB supporting rate or reduce the data rate between the wireless device and the AP to reduce the power consumption.

Second Preferred Embodiment

Figure 3:
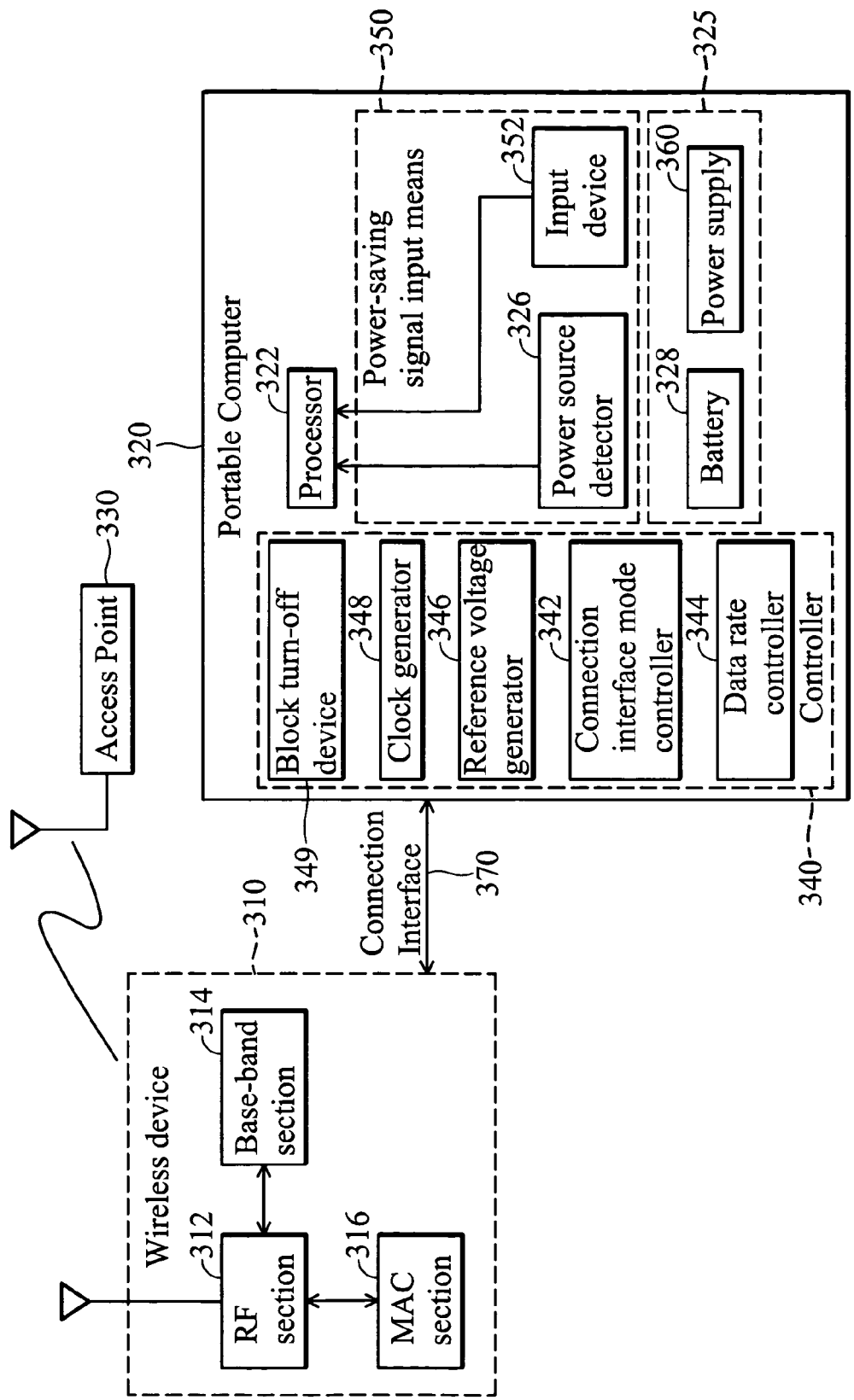
FIG. 3 is a function block diagram of a portable computer includes a wireless device according to the second embodiment of the invention.

FIG. 3 is a function block diagram of a portable computer including a wireless device according to the second embodiment of the invention. The portable computer 320, such as a notebook computer, communicates with an access point (AP) 330 through a wireless device 310 which can be provided inside the portable computer 320 or simply serving as an external device.

The wireless device 310 connects to the portable computer 320 via a connection interface 370 such as a USB interface. The wireless device 310, such as 802.11a, 802.11b or 802.11g wireless device, includes an RF section 312, a MAC (Medium Access Control) section 316 and a baseband section 314, communicating with the AP 330 using a data rate. The portable computer 320 includes managing controller 340 which comprises an connection interface mode controller 342 (such as a USB controller) for changing the connection interface mode according to detaching and re-attaching operation of the connection interface 370, a data rate controller 344 for adjusting the data transmission rate between the wireless device 310 and the AP 330, a power unit 325 and a power-saving input device 350 which includes a power source detector 326 and an input device 352 and is connected to a processor 322.

The power unit 325 comprises a battery 328 and power supply 360 which receives and converts an external AC source, respectively powering the portable computer 320.

The power source detector 326 is used to recognize that the portable computer 320 is powered by the battery 328 or the power supply 360 and to detect the power level of the power unit 325.

In this embodiment, through the power-saving input device 350, a power-saving event can be triggered and the USB controller is notified to response to the power-saving event. The managing controller 340 further includes a clock generator 348, a reference voltage generator 346 and a block turn-off device 349. The connection interface 370 can be an USB interface, a RS232 interface or other interface.

The main steps of the power management method for a portable computer 320 according to a second embodiment of the invention is similar to those disclosed according to the flow chart of FIG. 2, and are not described here for brevity, except for the step A.

Figure 4:
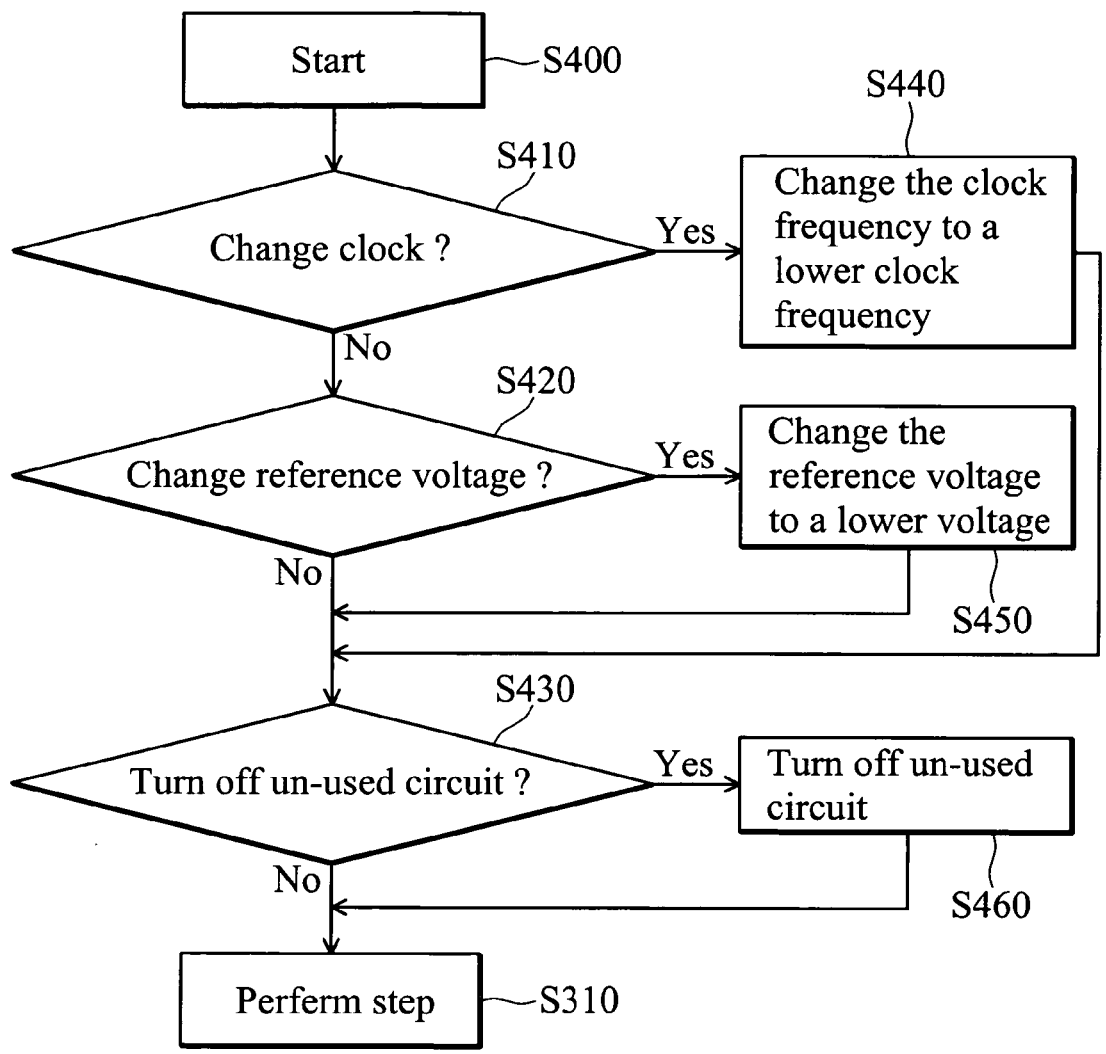
FIG. 4 is a flowchart showing the detailed steps of step A of FIG. 2.

FIG. 4 is a flowchart showing detailed steps in step A of FIG. 2. The step A includes the following steps:

At step S400, start the process.

At step S410, if the power-saving signal or the power-saving event indicates the portable computer 320 needs to reduce the (operation) clock frequency, then step S440 is performed to reduce the clock frequency, otherwise step S420 is performed. Step S440 reduces the system power consumption of the portable computer 320 by reducing the clock frequency.

At step S420, if the power-saving signal or the power-saving event indicates the portable computer 320 needs to reduce the reference voltage, then step S450 is performed to reduce the reference voltage to a lower reference voltage, otherwise step S430 is performed. Step S450 reduces the system power consumption by reducing the reference voltage.

At step S430, if the power-saving signal or the power-saving event indicates the portable computer 320 needs to turn off the un-used circuit or block, then step S460 is performed to turn off un-used circuit, otherwise step S310 in FIG. 2 is performed. Step S460 reduces the system power consumption by turning-off the un-used circuit.

In the other words, the present invention provides a power management method for managing power consumption of a portable computer having a battery and communicating with an access point (AP) through a wireless device connected to the portable computer via a USB interface. The USB interface at least has a first and second mode respectively with a first and second supporting rate less than the first supporting rate. The AP communicates with the wireless device with a first data rate. The portable computer works under a first clock frequency and a first reference voltage, wherein the portable computer includes a first circuit which is standby or suspends its function under power-saving mode, and the wireless device includes a second circuit which is standby or suspends its function under power-saving mode, the method comprises the steps of: (a) inputting a power-saving signal through an input device, such as a keyboard or button of the portable computer;

(b) detaching and re-attaching the wireless device to the portable computer from the first supporting rate to the second supporting rate; wherein, taking the USB interface as an example, the first USB supporting rate equals 480 Mbps (High speed) if the first USB mode is USB 2.0 standard, and wherein the first USB supporting rate equals 12 Mbps (Full speed) if the first USB mode is USB 1.1 standard.

(c) decreasing the first data rate to a second data rate between the AP and the wireless device, wherein the second date rate is less than the first data rate; wherein the second supporting rate is one selected from 480 Mbps, 12 Mbps and 1.5 Mbps, the second data rate is one selected from 54, 48, 36, 24, 18, 12, 9 and 6 Mbps for 802.11a standard, the second data rate is one selected from 11, 5.5, 2 and 1 Mbps for 802.11b standard, and the second data rate is one selected from 54, 48, 36, 24, 18, 12, 11, 9, 6, 5.5, 2 and 1 Mbps for 802.11g standard.

(d) reducing the first clock frequency of the portable computer to a second clock frequency, the second clock frequency is lower than the second clock frequency.

(e) reducing the first reference voltage to a second reference voltage, the second reference voltage is less than the first reference voltage.

(f) turning off the first circuit of the portable computer.

For the convenience in understanding the adjustment of the data rate in the present invention, the related data list for 802.11a/b/g and USB interface is shown in FIG. 5.

As for the detailed implementation of the function blocks of the clock generator 348, the reference voltage generator 346, and power source detection means 326 of the FIG. 3 can be seen in the related arts, and is not described here.

US application number US2005/0138444A1, titled as "Frequency voltage mechanism for microprocessor power management", discloses a power management technique which adjusts the clock frequency and the voltage of the microprocessor.

The input device 352 of FIG. 3 of the present invention can include a remote controller coupled to a wireless receiver, or the like.

U.S. Pat. No. 6,072,334, entitled "signal converter with a dynamically adjustable reference voltage and chipset including the same", discloses a method of reducing power consumption of the chipset by adjusting reference voltage.

U.S. Pat. No. 6,034,508, entitled "Battery life extending power-switching device for all-time operational system", discloses a switching method and apparatus of switching power sources from a battery or an external power source to an all-time circuit by means of a power source detection circuit to detect the power sources.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A portable computer connected to a wireless device with a USB interface with a supporting rate which is adjustable, the wireless device communicating with an AP (Access Point) via wireless communication with a data rate which is adjustable, comprising:
   a USB interface connecting the portable computer to the wireless device;
   a power unit including a battery and a power supply receiving an external AC source;
   a USB interface mode controller decreasing the supporting rate when the portable computer is switches from being powered by the power supply to being powered by the battery;

a data rate controller decreasing the data rate when the portable computer is switches from being powered by the power supply to being powered by the battery; and wherein a circuit in the wireless device is turned off when the portable computer is switches from being powered by the power supply to being powered by the battery.

2. The portable computer as claimed in claim 1, wherein the USB interface mode controller decreases the supporting rate when the data rate is lower than a threshold.

* * * * *